United States Patent [19]

Badejo et al.

[11] Patent Number: 5,683,502

[45] Date of Patent: Nov. 4, 1997

[54] INCORPORATION OF AROMATIC POLYCYCLIC COMPOUNDS IN QUINACRIDONE PROCESSES

[75] Inventors: Ibraheem T. Badejo, N. Charleston; Daphne J. Rice, Charleston, both of S.C.

[73] Assignee: Bayer Corporation, Pittsburgh, Pa.

[21] Appl. No.: 639,599

[22] Filed: Apr. 29, 1996

[51] Int. Cl.$^6$ .......................... C09B 48/06; C09B 67/52
[52] U.S. Cl. .......................... 106/495; 106/497; 546/49; 546/56
[58] Field of Search .................. 106/495, 497; 546/49, 56

[56] References Cited

U.S. PATENT DOCUMENTS

| 3,157,659 | 11/1964 | Deuschel et al. | 546/56 |
|---|---|---|---|
| 3,256,285 | 6/1966 | Fuchs et al. | 546/28 |
| 3,257,405 | 6/1966 | Gerson et al. | 546/29 |
| 3,317,539 | 5/1967 | Jaffe | 546/57 |
| 4,317,682 | 3/1982 | Katsura et al. | 106/496 |
| 4,455,173 | 6/1984 | Jaffe | 106/495 |
| 4,810,304 | 3/1989 | Jaffe et al. | 106/495 |
| 5,084,100 | 1/1992 | Bauman | 106/495 |
| 5,236,498 | 8/1993 | Zaloum et al. | 106/497 |
| 5,368,641 | 11/1994 | Dietz et al. | 106/495 |
| 5,457,203 | 10/1995 | Hendi et al. | 546/56 |
| 5,472,496 | 12/1995 | Hendi et al. | 106/497 |

OTHER PUBLICATIONS

S.S. Labana and L.L. Labana, "Quinacridones" in Chemical Review, 67, 1–18 Jan. 25, 1967.

*Primary Examiner*—Mark L. Bell
*Assistant Examiner*—Scott Hertzog

*Attorney, Agent, or Firm*—Joseph C. Gil; Richard E. L. Henderson

[57] ABSTRACT

This invention relates to a process for the preparation of quinacridone pigments by (a) heating, at a temperature of about 80° C. to about 145° C., a reaction mixture containing (i) 2,5-dianilinoterephthalic acid, a 2,5-dianilino-3,6-dihydroterephthalic acid ester, and/or a derivative thereof, (ii) about 3 to about 15 parts by weight, per part of component (a)(i), of a dehydrating agent, and (iii) about 0.1 to about 15 percent by weight, based on component (a)(i), of one or more non-pigmentary aromatic polycyclic compounds and/or derivatives thereof, with the proviso that if component (a)(i) is a 2,5-dianilino-3,6-dihydroterephthalic acid ester or a derivative thereof, reaction step (a) additionally comprises an oxidation step;

(b) drowning the reaction mixture from step (a) by adding said reaction mixture to about 3 to about 15 parts by weight, per part of component (a)(i), of a liquid in which the quinacridone pigment is substantially insoluble;

(c) isolating the quinacridone pigment;

(d) optionally, conditioning the quinacridone pigment; and (e) optionally, blending the resultant pigment with one or more quinacridone derivatives.

15 Claims, No Drawings

INCORPORATION OF AROMATIC POLYCYCLIC COMPOUNDS IN QUINACRIDONE PROCESSES

BACKGROUND OF THE INVENTION

This invention relates to a process for the preparation of quinacridone pigments having reduced particle size, improved coloristic properties, and improved rheological properties. The addition of certain aromatic polycyclic compounds and/or their derivatives during quinacridone synthesis provides quinacridone pigments having deeper, brighter, and more transparent masstones, increased metallic brightness, and improved theological properties.

Processes for the preparation of quinacridone are known. E.g., S. S. Labana and L. L. Labana, "Quinacridones" in *Chemical Review*, 67, 1–18 (1967), and U.S. Pat. Nos. 3,157,659, 3,256,285, and 3,317,539. The quinacridones thus obtained, known as crude quinacridones, are generally unsuitable for use as pigments and must undergo one or more additional finishing steps to modify the particle size, particle shape, or crystal structure to achieve pigmentary quality.

A preferred method for preparing quinacridones involves thermally inducing ring closure of 2,5-dianilinoterephthalic acid intermediates, as well as known aniline-substituted derivatives thereof, in the presence of polyphosphoric acid. E.g., U.S. Pat. No. 3,257,405. After ring closure is complete, the melt is drowned by pouring into a liquid in which the quinacridone is substantially insoluble, usually water and/or an alcohol. The resultant crystalline pigment is then further conditioned by solvent treatment or milling in combination with solvent treatment.

It is also possible to use 2,5-dianilino-3,6-dihydroterephthalic acid as a starting material in the ring-closure reaction. The resultant dihydroquinacridone must, however, be oxidized and then conditioned.

Final particle size of quinacridone pigments can be controlled by the methods used in both synthesis and aftertreatment. For example, quinacridone pigments can be made more transparent by reducing the particle size or more opaque by increasing the particle size. In known methods, particle size is generally controlled during precipitation of the pigment by drowning or during milling or solvent treatment of the crude pigment. Tinctorial strength and transparency of pigments can also be affected by solvent treatment. Aftertreatment steps that manipulate the crude pigments particle size are often referred to as conditioning methods.

Several suitable conditioning methods are known. However, the most commonly used methods involve milling the dried crude quinacridone, generally in the presence of undesirably large amounts of an inorganic salt that must subsequently be removed. Pigmentary quinacridones can also be obtained by first premilling the dried crude material and then treating the milled material with an organic liquid. Other methods involve a premilling step followed by another milling step using water and small amounts of an organic liquid. Pigmentary quinacridones can also be obtained by heat treatment of crude presscake in large quantities of solvent. Various additives have been added during the milling, solvent treatment, or post-solvent treatment steps to further improve pigment properties. For example, U.S. Pat. No. 4,455,173 discloses a process in which crude quinacridone pigments are acid pasted or ball milled and then milled in an organic liquid, preferably in the presence of a 2-phthalimidomethylquinacridone particle-size growth inhibitor. U.S. Pat. No. 5,084,100 discloses a method in which crude quinacridone is ball milled in the presence of aluminum sulfate and esters of alkanedicarboxylic acids.

The addition of certain quinacridone derivatives to the ring-closure step has also been reported. For example, U.S. Pat. No. 5,368,641 discloses the use of various quinacridone derivatives in the manufacture of 2,9-dimethylquinacridone. The present invention, in contrast, uses classes of certain aromatic polycyclic compounds rather than quinacridones in the ring-closure step. European Patent Application 643, 110 (counterpart of U.S. Pat. No. 5,457,203) describes the use of quinacridone derivatives during the oxidation of dihydroquinacridone (prepared from 2,5-dianilino-3,6-dihydroterephthalic acid) to quinacridone. The present invention, in contrast, not only uses aromatic polycyclic compounds other than quinacridones as additives but also uses the additives in the ring-closure step.

Compounds suitable for the present invention have been described as useful for treating various pigments, including quinacridones (e.g., British Patent 2,058,813), but such derivatives have previously been added only to fully formed quinacridone pigments. The present invention differs from such methods in that non-pigmentary aromatic polycyclic compounds are added during the ring-closure step of quinacridone synthesis. When added to the ring-closure step, and optionally also during the finishing step, such compounds can provide quinacridone pigments having desirable coloristic properties that are particularly desirable for automotive finishes.

The present invention provides smaller particle size quinacridones having improved performance properties by the addition of certain aromatic polycyclic compounds and/or their derivatives to the ring-closure step of the quinacridone synthesis, and optionally also to the subsequent conditioning steps. The addition of such compounds during quinacridone synthesis (i.e., ring-closure) before precipitation results in a deeper, brighter pigment having improved transparency and rheological properties, as well as brighter metallics. The process of the invention is in principle applicable to all quinacridone pigment manufacturing processes that include an "acid pasting" step, but the greatest improvement in coloristic properties is expected for ring-closure processes, including processes used to prepare quinacridone solid solutions.

SUMMARY OF THE INVENTION

This invention relates to a process for the preparation of quinacridone pigments comprising (a) heating, at a temperature of about 80° C. to about 145° C. (preferably 100° C. to 130° C.) (preferably for about one to about 24 hours), a reaction mixture comprising (i) 2,5-dianilinoterephthalic acid, a 2,5-dianilino-3,6-dihydroterephthalic acid ester, a derivative of 2,5-dianilinoterephthalic acid or a 2,5-dianilino-3,6-dihydroterephthalic acid ester having one or more substituents in at least one aniline ring, or a mixture thereof, (ii) about 3 to about 15 parts by weight (preferably 3 to 10 parts by weight), per part of component (a)(i), of a dehydrating agent (preferably polyphosphoric acid), and (iii) about 0.5 to about 15 percent by weight (preferably 1 to 10 percent by weight), based on component (a)(i), of one or more non-pigmentary (preferably colorless or substantially colorless) aromatic polycyclic compounds and/or derivatives thereof (preferably anthraquinone or pyrene derivatives), with the proviso that if component (a)(i) is a 2,5-dianilino-3,6-dihydroterephthalic acid ester or a derivative thereof, reaction step (a) additionally comprises an oxidation step (which converts the initially formed dihydroquinacridone intermediate to the corresponding quinacridone);

(b) drowning the reaction mixture from step (a) by adding said reaction mixture to about 3 to about 15 parts by weight (preferably to 10 parts by weight), per part of component (a)(i), of a liquid in which the quinacridone pigment is substantially insoluble;

(c) isolating the quinacridone pigment;

(d) optionally, conditioning the quinacridone pigment (optionally in the presence of additional quantities of the non-pigmentary aromatic polycyclic compound and/or derivative thereof); and (e) optionally, blending (preferably dry blending) the resultant quinacridone pigment with one or more quinacridone derivatives.

DETAILED DESCRIPTION OF THE INVENTION

Quinacridone pigments (by which is meant unsubstituted quinacridone, quinacridone derivatives, and solid solutions thereof) are prepared according to the invention by first ring-closing 2,5-dianilinoterephthalic acid intermediates, including known aniline-substituted derivatives thereof, by heating such terephthalic acid intermediates in the presence of a dehydrating agent (preferably polyphosphoric acid) and an aromatic polycyclic compound according to the invention or, less preferably, by thermally inducing ring closure in a high-boiling solvent in the presence of an aromatic polycyclic compound according to the invention. The quinacridone is then drowned and isolated by known methods. The quinacridone pigment is preferably also subjected to additional conditioning steps to improve pigmentary properties and, if desired, blended with an additional quinacridone derivative.

The process of the invention can be used to prepare unsubstituted quinacridone or ring-substituted quinacridone derivatives, depending on whether the ring closure is carried out using 2,5-dianilinoterephthalic acid or derivatives thereof having one or more substituents in at least one of the two aniline rings. Although essentially any 2,5-dianilinoterephthalic acid derivatives known in the art can be used, particularly preferred 2,5-dianilinoterephthalic acid derivatives are those in which both aniline moieties are substituted (typically with the same substituent) in the para position with groups such as halogen (preferably chlorine), $C_1$–$C_6$ alkyl (preferably methyl), and $C_1$–$C_6$ alkoxy (preferably methoxy). It is also possible to use 2,5-dianilinoterephthalic acid derivatives in which both aniline moieties are substituted in the ortho or meta positions. Examples of suitable 2,5-dianilinoterephthalic acid derivatives include 2,5-di(4-chloroanilino)terephthalic acid, 2,5-di(4-methylanilino)terephthalic acid, 2,5-di(4-methoxyanilino)terephthalic acid.

It is also possible to use mixtures containing 2,5-dianilinoterephthalic acid and one or more derivatives thereof or mixtures containing two or more 2,5-dianilinoterephthalic acid derivatives. The use of such mixtures provides a particularly advantageous method for obtaining quinacridone solid solutions. Mixtures containing 2,5-dianilinoterephthalic acid and/or a derivative thereof in combination with a fully formed quinacridone pigment (generally in crude form) can also often be used.

Ring-closure step (a) is carried out in a dehydrating agent, particularly a strong acid such as polyphosphoric acid, acidic esters of polyphosphoric acid, or sulfuric acid. E.g., U.S. Pat. No. 4,758,665; and S. S. Labana and L. L. Labana, "Quinacridones" in *Chemical Reviews*, 67, 1–18 (1967). Polyphosphoric acid having a phosphate content equivalent to about 110–120% $H_3PO_4$ is particularly preferred. When using polyphosphoric acid, the weight ratio of polyphosphoric acid to the terephthalic acid intermediate is typically about 3:1 to about 10:1 (preferably 4:1 to 8:1 ). The lower ratios can give high viscosity reaction masses but are generally preferred because of cost considerations.

It is sometimes preferable to use a 2,5-dianilino-3,6-dihydroterephthalic acid ester (preferably a $C_1$–$C_6$ alkyl ester) or a derivative thereof as a starting material in the ring-closure reaction, after which the resultant dihydroquinacridone must be oxidized and collected. The present invention is also applicable to this variant of quinacridone synthesis. It is, of course, possible to use mixtures of 2,5-dianilino-3,6-dihydroterephthalic acid ester and/or derivatives thereof to obtain quinacridone solid solutions.

A critical feature of the invention is the presence of a non-pigmentary aromatic polycyclic compound during the ring-closure reaction. The term "non-pigmentary" as used herein means that the compounds are significantly less highly colored and lack good pigmentary properties in comparison to the quinacridone pigments with which they are used. That is, suitable non-pigmentary aromatic polycyclic compounds would not themselves have practical utility as pigments. Suitable non-pigmentary aromatic polycyclic compounds can even be colorless or substantially colorless. The term "substantially colorless" does not mean that the aromatic polycyclic compounds must be absolutely devoid of color in the visible region but instead means only that the aromatic polycyclic compounds are insignificantly colored in comparison to the quinacridone pigments with which they are used. For example, preferred substantially colorless aromatic polycyclic compounds will exhibit molar absorptivities less (preferably at least about an order of magnitude less) than those of the quinacridone pigments with which they are used.

Suitable aromatic polycyclic compounds include compounds having the following formula (I)

$$Q(A-Y)_n \qquad (I)$$

in which Q represents an aromatic polycyclic moiety; A represents —O—, —S—, —NR$^a$— (in which R$^a$ is hydrogen, $C_1$–$C_{12}$ alkyl, $C_2$–$C_{12}$ alkenyl, $C_5$–$C_7$ cycloalkyl, $C_6$–$C_{10}$ aryl, or $C_7$–$C_{16}$ aralkyl), —SO$_2$—, —CO—, —Alk— (in which —Alk— is $C_1$–$C_8$ alkylene, substituted $C_1$–$C_8$ alkylene, $C_5$–$C_7$ cycloalkylene, or substituted $C_5$–$C_7$ cycloalkylene), or —Ar— (in which —Ar— is $C_6$–$C_{10}$ arylene or substituted $C_6$–$C_{10}$ arylene) bridging groups, chemically reasonable combinations of such bridging groups, or a direct bond between Q and Y (preferably —SO$_2$—NH—Alk—, —CO—NH—Alk—, —Alk—, or direct bonds); Y represents hydrogen, $C_1$–$C_{12}$ alkyl, $C_2$–$C_{12}$ alkenyl, $C_5$–$C_7$ cycloalkyl, $C_5$–$C_7$ cycloalkenyl, $C_6$–$C_{10}$ aryl, heteroaryl having five or six ring atoms (in which at least one such ring atom is N, O, S, or a combination thereof, and which are optionally fused to one or more additional aromatic rings), $C_7$–$C_{16}$ aralkyl, OR$^b$ (in which R$^b$ is hydrogen, metal, or $C_1$–$C_{12}$ alkyl), —NR$^c$R$^d$ (in which R$^c$ and R$^d$ are independently hydrogen, $C_1$–$C_{12}$ alkyl, $C_2$–$C_{12}$ alkenyl, $C_5$–$C_7$ cycloalkyl, $C_6$–$C_{10}$ aryl, or $C_7$–$C_{16}$ aralkyl, or $R^c$ and $R^d$ together are $C_4$–$C_6$ alkylene forming a heterocyclic group or are aliphatic or aromatic dicarbony groups forming an imide, and wherein $R^c$ and $R^d$ optionally can further contain hetero-atoms such as N, O, or S and optionally can further be substituted with $C_1$–$C_{12}$ alkyl, $C_1$–$C_{12}$ alkoxy, $C_2$–$C_{12}$ alkenyl, $C_5$–$C_7$ cycloalkyl, $C_5$–$C_7$ cycloalkenyl, $C_5$–$C_7$ cycloalkoxy, $C_6$–$C_{10}$ aryl, $C_6$–$C_{10}$ aryloxy, $C_7$–$C_{16}$ aralkyl, $C_7$–$C_{16}$ aralkoxy, —OH, halogen, —CN, carboxyl, —CO—NR$^c$R$^d$, or —SO$_2$—NR$^c$R$^d$), or halogen; and n is from about 0.01 to about 4. Fractional values for n indicate that the aromatic polycyclic compounds can be used as mixtures of compounds having various degrees of substitution, including the same unsubstituted aromatic polycyclic compound (i.e., QH). When more than one group —A—Y is present, the various A and Y groups can, of course, be the same or different from one another. The aromatic moiety Q can be derived from essentially any class of non-pigmentary aromatic polycyclic compound, including heteroaromatic compounds in which at least one ring atom is N, O, S, or a combination thereof, such as anthracene, phenanthrene, pyrene, chrysene, indole, thiazole, benzimidazole, quinoline, acridone, anthraquinone, phenothiazine, quinazoline, carbazole, benzanthrone, and perylene. The aromatic polycyclic moiety itself can contain one or more substituents other than the —A—Y groups, including, for example, halogen (preferably chlorine), $C_1$–$C_6$ alkyl (preferably methyl), $C_1$–$C_6$ alkoxy (preferably methoxy), $C_5$–$C_7$ cycloalkyl, $C_5$–$C_7$ cycloalkoxy, $C_6$–$C_{10}$ aryl, $C_6$–$C_{10}$ aryloxy, $C_7$–$C_{16}$ aralkyl, $C_7$–$C_{16}$ aralkoxy, aminoalkyl, nitro, and cyano. Particularly preferred aromatic polycyclic compounds include anthraquinone or derivatives thereof (particularly mono- and disulfonic acid salts) or pyrene or derivatives thereof (particularly tetrasulfonic acid salts).

As used herein, the term "$C_1$–$C_{12}$ alkyl" refers to straight or branched chain aliphatic hydrocarbon groups having from 1 to 12 carbon atoms. Examples of $C_1$–$C_{12}$ alkyl are methyl, ethyl, propyl, butyl, pentyl, hexyl, heptyl, octyl, nonyl, decyl, undecyl, dodecyl, and the isomeric forms thereof. The term "$C_1$–$C_{12}$ alkoxy" refers to straight or branched chain alkyl oxy groups having from 1 to 12 carbon atoms. Examples of $C_1$–$C_{12}$ alkoxy are methoxy, ethoxy, propoxy, butoxy, pentyloxy, hexyloxy, heptyloxy, octyloxy, nonyloxy, decyloxy, undecyloxy, dodecyloxy, and the isomeric forms thereof. The term "$C_2$–$C_{12}$ alkenyl" refers to straight or branched chain unsaturated aliphatic hydrocarbon groups having from 2 to 12 carbon atoms and one carbon-carbon double bond. Examples of $C_2$–$C_{12}$ alkenyl are ethenyl, propenyl, butenyl, pentenyl, hexenyl, heptenyl, octenyl, nonenyl, decenyl, undecenyl, dodecenyl, and the isomeric forms thereof. The term "$C_5$–$C_7$ cycloalkyl" refers to cycloaliphatic hydrocarbons groups having from 5 to 7 carbon atoms. Examples of $C_5$–$C_7$ cycloalkyl are cyclopentyl, cyclohexyl, and cycloheptyl. The term "$C_5$–$C_7$ cycloalkoxy" refers to cycloalkyl oxy groups having from 5 to 7 carbon atoms. Examples of $C_5$–$C_7$ cycloalkoxy are cyclopentyloxy, cyclohexyloxy, and cycloheptyloxy. The term "$C_5$–$C_7$ cycloalkenyl" refers to cycloaliphatic hydrocarbons groups having from 5 to 7 carbon atoms and one carbon-carbon double bond. Examples of $C_5$–$C_7$ cycloalkenyl are cyclopentenyl, cyclohexenyl, and cycloheptenyl. The term "$C_6$–$C_{10}$ aryl" refers to phenyl and 1- or 2-naphthyl, as well as to phenyl and naphthyl groups substituted with alkyl, alkoxy, halogen, cyano, an nitro as defined herein. The term "$C_6$–$C_{10}$ aryloxy" refers to phenoxy and 1- or 2-naphthoxy, in which the aryl portion can optionally be substituted as described above for "aryl." The term "heteroaryl" refers to five- and six-membered aromatic groups in which at least one ring atom is N, O, S, or a combination thereof, and which can optionally be fused to one or more additional aromatic rings. Such heteroaryl groups are attached to group A at a ring carbon atom or, where chemically reasonable, at a ring nitrogen atom. Examples of heteroaryl are pyrrolyl, imidazolyl, pyrazolyl, furanyl, thiophenyl, isothiazolyl, pyridinyl, pyrazinyl, pyrimidinyl, pyridazinyl, and the like. The term "$C_7$–$C_{16}$ aralkyl" refers to $C_1$–$C_6$ alkyl substituted with $C_6$–$C_{10}$ aryl such that the total number of carbon atoms is from 7 to 16. Examples of $C_7$–$C_{16}$ aralkyl are benzyl, phenethyl, and naphthylmethyl. The term "$C_7$–$C_{16}$ aralkoxy" refers to $C_1$–$C_6$ alkoxy substituted with $C_6$–$C_{10}$ aryl such that the total number of carbon atoms is from 7 to 16. An example of $C_7$–$C_{16}$ aralkoxy is benzyloxy. The term "$C_1$–$C_8$ alkylene" refers to straight or branched chain difunctional aliphatic hydrocarbon groups having from 1 to 8 carbon atoms. Examples of $C_1$–$C_8$ alkylene are methylene, ethylene, propylene, butylene, pentylene, hexylene, heptylene, and octylene, as well as the isomeric branched forms thereof. The related term "$C_4$–$C_6$ alkylene" refers to straight or branched chain difunctional aliphatic hydrocarbon groups having from 4 to 6 carbon atoms and bonded to the amide nitrogen atom through two different carbon atoms so as to form a heterocyclic ring. Examples of $C_4$–$C_6$ alkylene are butylene (forming a pyrrolidino substituent), optionally substituted with a methyl group; and pentylene (forming a piperidino substituent). The term "$C_5$–$C_7$ cycloalkylene" refers to difunctional cycloaliphatic hydrocarbon groups having from 5 to 7 carbon atoms. Examples of $C_5$–$C_7$ cycloalkylene are cyclopentylene, cyclohexylene, and cycloheptylene. The term "$C_6$–$C_{10}$ arylene" refers to phenylene and disubstituted naphthalene, in which the aryl portion can optionally be substituted as described above for "aryl". Examples of halogen are fluorine, chlorine, bromine, and iodine.

Particularly preferred aromatic polycyclic compounds are sulfonic acids having the following formula (II)

$$Q(SO_2—OR^b)_n \qquad (II)$$

in which Q represents an aromatic polycyclic compound; $R^b$ is hydrogen or a metal; and n is from about 0.01 to about 4. As with general formula (I), fractional values for n indicate that the derivatives can be used as mixtures, including mixtures containing the unsubstituted aromatic polycyclic compound. Suitable metals include alkali metals (such as lithium, sodium, and potassium), alkaline earth metals (such as magnesium, calcium, and barium), aluminum, transition metals and other heavy metals (such as nickel, iron, cobalt, manganese, copper, and tin). The pigment moiety Q present in the sulfonic acids and salts of formula (II) can be the same as described above for the compounds of formula (I) but are preferably anthraquinone and pyrene.

Suitable aromatic polycyclic compounds also include sulfonamides having the following formula (III)

$$Q(SO_2—NA—Alk—NR^cR^d)_n \qquad (III)$$

in which Q represents an aromatic polycyclic compound; Alk represents $C_1$–$C_8$ alkylene or $C_5$–$C_7$ cycloalkylene; $R^c$ and $R^d$ are independently hydrogen, $C_1$–$C_{12}$ alkyl, $C_2$–$C_{12}$ alkenyl, $C_5$–$C_7$ cycloalkyl, $C_6$–$C_{10}$ aryl, or $C_7$–$C_{16}$ aralkyl, or $R^c$ and $R^d$ together are $C_4$–$C_6$ alkylene forming a heterocyclic group; and n is from about 0.01 to about 4. $R^c$ and $R^d$ can also contain heteroatoms such as N, O, or S. As with general formula (I), fractional values for n indicate that the derivatives can be used as mixtures, including mixtures containing the unsubstituted aromatic polycyclic compound. The aromatic moiety Q present in the sulfonamides of formula (III) can be the same as described above for the compounds of formula (I).

The aromatic polycyclic compounds of the invention can be added at any point during or before ring-closure step (a). For example, and aromatic polycyclic compound can be added during the preparation of the 2,5-dianilinoterephthalic acid intermediates as long as the compound is stable to the reaction conditions.

The reaction mixture of step (a) is heated at a temperature of about 80° C. to about 145° C. (preferably 100° C. to 130° C.), preferably for about 1 to about 24 hours (more preferably for 1 to 12 hours).

After ring-closure step (a) is completed, the quinacridone pigment is precipitated (i.e., "drowned") in step (b) by adding the strongly acidic melt to a liquid in which the quinacridone pigment is substantially insoluble, preferably water, a water-miscible solvent (such as methanol, or other lower aliphatic alcohols), or mixtures thereof. Although it is possible to add the drowning liquid to the acidic melt (e.g., U.S. Pat. No. 3,265,699), the present invention is preferably carried out by adding the acidic melt to the solvent (compare U.S. Pat. No. 4,100,162).

Suitable drowning liquids include water and/or water-miscible organic liquids; including, for example, lower aliphatic alcohols, such as methanol; ketones and ketoalcohols, such as acetone, methyl ethyl ketone, and diacetone alcohol; amides, such as dimethylformamide and dimethylacetamide; ethers, such as tetrahydrofuran and dioxane; alkylene glycols and triols, such as ethylene glycol and glycerol; and other such organic liquids known in the art. Other organic liquids can be used but are generally less preferred.

The temperature of the drowning liquid is usually between about 5° C. and about 65° C. In general, lower drown temperatures give pigments having smaller particle sizes. However, because process cycle time is also very important (because of manufacturing cost), a shorter drowning time is preferred. The presence of aromatic polycyclic compound (a)(iii), which acts in part as a particle growth inhibitor, allows the solvent temperature to rise during the drowning process, thus shortening the time without excessive particle size growth.

It is possible but less preferred to include a portion of the aromatic polycyclic compound in the drown step.

The drowned pigment is then isolated in step (c) using methods known in the art, such as filtration, and then dried if desired. Other collection methods known in the art, such as centrifugation or even simple decantation, are also suitable.

The crystalline pigment obtained in step (c) can be conditioned in an optional step (d) using methods known in the art, such as solvent treatment or milling in combination with solvent treatment. Final particle size of the pigment can be controlled by varying the method of after-treatment. For example, pigments can be made more transparent by reducing the particle size or more opaque by increasing the particle size. Suitable milling methods include dry-milling methods such as sand-milling, ball-milling, and the like, with or without additives, or wet-milling methods such as salt-kneading, bead-milling, and the like in water or organic solvents, with or without additives. It is possible, although generally less preferred, to include a portion of the aromatic polycyclic compound (preferably less than about 50% of the total amount of non-quinacridone pigment) in conditioning step (d).

Tinctorial strength and transparency of the pigment can also be affected by solvent treatment carried out by heating a dispersion of the pigment, often in the presence of additives, in a suitable solvent. Suitable solvents include organic solvents, such as alcohols, esters, ketones, and aliphatic and aromatic hydrocarbons and derivatives thereof, and inorganic solvents, such as water. Suitable additives include compositions that lessen or avoid flocculation, increase pigment dispersion stability, and reduce coating viscosity, such as polymeric dispersants (or surfactants). E.g., U.S. Pat. Nos. 4,455,173; 4,758,665; 4,844,742; 4,895,948; and, 4,895,949.

After the pigment has been isolated and optionally conditioned, the pigment can be blended (preferably by dry blending) with one or more quinacridone derivatives known in the art. Suitable quinacridone derivatives for step (e) include quinacridone sulfonic acids and sulfonamides analogous to compounds of formulas (I), (II) and (III) above except that Q represents a quinacridone moiety.

Compared to previously known processes, pigments prepared according to the invention characteristically exhibit deeper (darker), brighter masstones, with improved transparency and rheological properties along with brighter metallics, all of which are highly desirable characteristics of quinacridone pigments, especially when used for automotive applications.

Because of their light stability and migration properties, the quinacridone pigments prepared according to the present invention are suitable for many different pigment applications. For example, pigments prepared according to the invention can be used as the colorant (or as one of two or more colorants) for very fast pigmented systems, such as mixtures with other materials, pigment formulations, paints, printing ink, colored paper, or colored macromolecular materials. The term "mixture with other materials" can be understood to include, for example, mixtures with inorganic white pigments, such as titanium dioxide (rutile) or cement, or other inorganic pigments. Examples of pigment formulations include flushed pastes with organic liquids or pastes and dispersions with water, dispersants, and if appropriate, preservatives. Examples of paints in which pigments of this invention can be used include, for example, physically or oxidatively drying lacquers, stoving enamels, reactive paints, two-component paints, solvent- or water-based paints, emulsion paints for weatherproof coatings, and distempers. Printing inks include those known for use in paper, textile, and tinplate printing. Macromolecular substances include those of a natural origin, such as rubber; those obtained by chemical modification, such as acetyl cellulose, cellulose butyrate, or viscose; or those produced synthetically, such as polymers, polyaddition products, and polycondensates. Examples of synthetically produced macromolecular substances include plastic materials, such as polyvinyl chloride, polyvinyl acetate, and polyvinyl propionate; polyolefins, such as polyethylene and polypropylene; high molecular weight polyamides: polymers and copolymers of acrylates, methacrylates, acrylonitrile, acrylamide, butadiene, or styrene; polyurethanes; and polycarbonates. The materials pigmented with the quinacridone pigments of the present invention can have any desired shape or form.

Pigments prepared according to this invention are highly water-resistant, oil-resistant, acid-resistant, lime-resistant, alkali-resistant, solvent-resistant, fast to over-lacquering, fast to over-spraying, fast to sublimation, heat-resistant, and resistant to vulcanizing, yet give a very good tinctorial yield and are readily dispersible (for example, in plastics materials).

The following examples further illustrate details for the process of this invention. The invention, which is set forth in the foregoing disclosure, is not to be limited either in spirit or scope by these examples. Those skilled in the art will readily understand that known variations of the conditions of the following procedures can be used. Unless otherwise noted, all temperatures are degrees Celsius and all percentages are percentages by weight.

EXAMPLES

Pigments prepared according to the Examples were analyzed by transmission electron microscopy using a Zeiss EM 109 instrument. Data were collected under the following conditions:
Acceleration voltage: 80 kV
Magnification: 100,000×, 40,000 ×, and 1,000×

Particle size data were obtained by the BET method (i.e., the method of St. Brunauer, P. H. Emroeft, and E. Teller, *J. Amer. Chem. Soc.*, 60, 309 (1938)).

X-ray diffraction patterns for pigments prepared according to the invention were obtained using a Siemens D-S000 Spectrometer. Data were collected under the following conditions:
Power: 50 kV at 40 mA
Slits: 1.0 mm divergence, 1.0 mm antiscatter, 0.1 mm detector
Step size: 0.01°
Step time: 3 seconds Differences in hue and chroma were measured using an Applied Color System Spectral Sensor (Hunt Associated Laboratories, Fairfax, Va.).

Solvent-based paint tests

Solvent-based paint tests were carried out using a generic alkyd melamine paint system. Pigment dispersions were prepared using a mixture of 33% AROPLAZ® 1453-X-50 alkyd resin (Reichhold Chemicals, Inc.), 63% xylene, and 4% pigment, which gave a pigment-to-binder ratio of 4:33 and a total solids content of 37%. The pigment-to-binder ratio was reduced 1:10 by addition of 2.3% AROPLAZ® 1453-X-50 alkyd resin and 6.5% RESIMENE® 717 melamine resin (Monsanto Company), which gave a total solids content of 40%. Masstone and transparency measurements were made using films applied at 152 µm and 38 µm wet film thickness, respectively, and flashed at room temperature for 30 minutes and at 121° C. for 30 minutes.

Undertone tint paints were prepared from the dispersion described above having a pigment-to-binder ratio of 4:33 by adding 31% of a dispersion prepared from 30% AROPLAZ® 1453-X-50 alkyd resin, 20% xylene, 5% NUOSPERSE® 657 (Hüls America), and 50% TI-PURE® R-960 $TiO_2$ pigment (DuPont); 21% AROPLAZ® 1453-X-50 alkyd resin; and 7% RESIMENE® 717 melamine resin, which gave a pigment-to-binder ratio of 1:2, a total solids content of 50%, and a TiO2-to-pigment ratio of 90:10. Color measurements were made using films applied at 76 µm wet film thickness and flashed at room temperature for 30 minutes and at 121° C. for 30 minutes.

Metallic paints were prepared from the dispersion described above having a pigment-to-binder ratio of 4:33 using an aluminum paste (available as 5251 AR from Silberline Manufacturing Co., Inc.), AROPLAZ® 1453-X-50 alkyd resin, and RESIMENE® 717 melamine resin in quantities that provided a pigment-to-binder ratio of 1:9, an aluminum-to-pigment ratio of 20:80, and a total solids content of 41%. Color measurements were made using films applied at 76 µm wet film thickness and flashed at room temperature for 30 minutes and at 121° C. for 30 minutes.

Water-based paint tests

Water-based paints tests were carried out using a waterborne base coat/solvent-borne clear coat system. Aqueous dispersions were prepared using a mixture of 12.4% AROLON® 559-G4-70 acrylic resin (Reichhold Chemicals, Inc.), 3.2% SOLSPERSE® 27000 hyperdispersant (Zeneca, Inc.), 1.6% 2-amino-2-methyl-1-propanol (Angus Chemical), and 18% pigment, which gave a pigment-to-binder ratio of 18:12 and a total solids content of 30%. The pigment-to-binder ratio was then reduced to 10:40 with additional AROLON® 559-G4-70 acrylic resin (total amount 26%) and 25% CYMEL® 325 melamine/formaldehyde resin (Cytec Industries), which gave a total solids content of 50%. Masstone and transparency measurements were made using films applied at 76 µm and 38 µm wet film thickness, respectively, and allowed to stand at room temperature for fifteen minutes and at 100° C. for five minutes. Clear coats containing a mixture of 80% of AROPLAZ® 1453-X-50 alkyd resin and 20% CYMEL® 325 melamine/formaldehyde resin at a total solids level of 57% were then applied over the base coat at a 76 µm wet film thickness allowed to stand at room temperature for fifteen minutes and at 121° C. for fifteen minutes.

Undertone tint paints were prepared from the reduced aqueous dispersions described above having a pigment-to-binder ratio of 10:40 by adding additional AROLON® 559-G4-70 acrylic resin, CYMEL® 325 melamine/formaldehyde resin, and 35% TINT-AYD® CW-5003 white dispersion (Daniel Products Company), which gave a pigment-to-binder ratio of 1:1.1, a total solids content of 55%, and a TiO2-to-pigment ratio of 90:10. Color measurements were made using films applied at 38 µm wet film thickness and allowed to stand at room temperature for fifteen minutes and at 100° C. for five minutes. Clear coats were then applied and baked as described above.

Metallic paints were prepared from the dispersion described above having a pigment-to-binder ratio of 18:12 using a water-dispersible aluminum pigment (available as HYDRO PASTE® 8726 from Silberline Manufacturing Co., Inc.), AROLON® 559-G4-70 acrylic resin, and CYMEL® 325 melamine/formaldehyde resin in quantities that provided a pigment-to-binder ratio of 1:2, an aluminum-to-pigment ratio of 20:80, and a total solids content of 43%. Color measurements were made using films applied at 38 µm wet film thickness and baked as described above. Clear coats were then applied and baked as described above.

Plastic Dispersibility Test

Pigment dispersibility in polyvinyl chloride ("PVC") was evaluated by comparing hot-milled and cold-milled color development according to the following procedure. For each sample tested, a 50 g portion of flexible PVC was added to a hot (155° C.) two-roll mill having a nip thickness of 25 mils (ca. 0.6 mm) and fluxed until uniform. A 0.050 g portion of the test pigment or comparison pigment was sprinkled into the nip over a period of about ten seconds, after which the fluxed material was cut and rolled on the mill for five minutes. The pigmented sheet was then removed from the mill and placed on a clean flat surface to cool. A piece cut from the resultant sheet and allowed to cool to room temperature was used as the "hot-milled" sample for evaluation. A sample cut from the same sheet while still warm was placed on a cold (24° C.) two-roll mill having a nip thickness of 21 mils (ca. 0.5 mm), then folded and passed through the mill seven times. The cold-rolled sheet was again fluxed in the hot mill until smooth. A sample cut from the resultant sheet was used as the "cold-milled" sample for evaluation. Color development was evaluated using a scale of 1 to 5 based on the difference between hot-milled and cold-milled color development, where 1 represents poor dispersibility (as evidenced by extreme differences in color development) and 5 represents excellent dispersibility (as evidenced by essentially no difference in color development).

Example 1

Pigmentary 2,9-dimethylquinacridone was prepared according to the invention with the incorporation of 10% by weight, relative to the 2,9-dimethylquinacridone, of anthraquinone in the ring-closure reaction.

To 300 g of polyphosphoric acid (112% phosphoric acid) heated at 88° C. was added 6.8 g of anthraquinone followed by 68.2 g of 2,5-di(4-methylanilino)terephthalic acid added over a period of 35 minutes, the temperature being maintained below 120° C. by adjustment of the addition rate. The mixture was heated at 123° C. for two hours. After the melt was cooled to 93° C., it was slowly poured into 494 g of methanol, the temperature being maintained below 64° C. by external cooling and adjustment of melt addition rate. The slurry was heated at reflux for one hour, cooled to below 60° C., diluted with water, filtered, and washed until acid free. The resultant presscake was reslurried in water. After adjustment of the pH to greater than 7, 5.5 g of 50% sodium hydroxide was added and the resultant slurry was heated at 90° C. for one hour. The slurry was cooled, filtered, and washed with water until alkali free, then reslurried in water. After adjustment of the pH to 9.5, the slurry was heated at 143° C. for two hours in a closed system (e.g., a pressure reactor), and cooled to 40° C. After the slurry was acidified to pH 3.3, an emulsion of 2.2 g of an anionic suffactant, 30 g of a petroleum distillate, and 80 g of water was added, and the slurry was stirred for three hours. The solid component was collected by filtration and washed with water. The wet cake can be dried or used as is for specific applications. Here, the wet cake was dried in an oven at 60° C. to give approximately 60 g of 2,9-dimethylquinacridone as a magenta pigment.

A water-based paint prepared as described above exhibited improved theological properties when compared to QUINDO® Magenta RV-6832 (available from Bayer Corporation).

Example 2

Pigmentary 2,9-dimethylquinacridone was prepared exactly as described in Example 1 except for using 5% by weight, relative to the quinacridone, of anthraquinone in the ring-closure reaction. 2,9-Dimethylquinacridone (56 g) was obtained as a magenta pigment having a good dispersibility in PVC.

| Dispersibility in PVC | |
|---|---|
| Test sample | Dispersibility |
| Example 2 | 2 |
| QUINDO® Magenta RV-6832 | 1–2 |

Example 3

Pigmentary 2,9-dimethylquinacridone was prepared exactly as described in Example 1 except for using 10% by weight, relative to the quinacridone, of anthraquinone-2-sulfonic acid sodium salt monohydrate in the ring-closure reaction. 2,9-Dimethylquinacridone (56 g) was obtained as a magenta pigment.

An alkyd melamine enamel paint prepared as described above exhibited a deeper, brighter, and more transparent masstone compared to a paint prepared using QUINDO® Magenta RV-6832.

A water-based paint prepared as described above exhibited a deeper, brighter masstone with improved transparency and increased metallic brightness when compared to QUINDO® Magenta RV-6832.

Example 4

Pigmentary 2,9-dimethylquinacridone was prepared exactly as described in Example 1 except for using 10% by weight, relative to the quinacridone, of anthraquinone-2,6-disulfonic acid disodium salt in the ring-closure reaction. 2,9-Dimethylquinacridone (58 g) was obtained as a magenta pigment.

A water-based paint prepared as described above exhibited a brighter masstone with improved transparency when compared to QUINDO® Magenta RV-6832.

Example 5

Pigmentary 2,9-dimethylquinacridone was prepared exactly as described in Example 1 except for using 10% by weight, relative to the quinacridone, of a mixture of anthraquinone and phthalimidomethyl-anthraquinone (prepared according to the method of U.S. Pat. No. 3,275,637) having a molar ratio of anthraquinone-to-phthalimidomethyl-anthraquinone of about 9:1 in the ring-closure reaction. 2,9-Dimethylquinacridone (54 g) was obtained as a magenta pigment.

An alkyd melamine enamel paint prepared as described above exhibited a deeper, brighter, and more transparent masstone and reduced viscosity compared to a paint prepared using QUINDO® Magenta RV-6832.

A water-based paint prepared as described above exhibited a deeper, brighter masstone with improved transparency and increased metallic brightness when compared to QUINDO® Magenta RV-6832.

Example 6

Pigmentary 2,9-dimethylquinacridone was prepared exactly as described in Example 1 except for using 10% by weight, relative to the quinacridone, of anthraquinone-2-sulfonic acid sodium salt monohydrate in the ring-closure reaction and subsequent dry mixing with 9% of N,N-diethylaminopropylquinacridone sulfonamide after the conditioning step. The 2,9-dimethylquinacridone was obtained as a magenta pigment.

An alkyd melamine enamel paint prepared as described above exhibited a deeper, brighter masstone with improved transparency and reduced viscosity compared to a paint prepared using QUINDO® Magenta RV-6832.

A water-based paint prepared as described above exhibited a deeper, brighter masstone with improved transparency, stronger metallic brightness, and reduced viscosity when compared to a paint prepared using QUINDO® Magenta RV-6832.

Example 7

Pigmentary 2,9-dimethylquinacridone was prepared exactly as described in Example 1 except for using 10% by weight, relative to the quinacridone, of anthraquinone-2-sulfonic acid sodium salt monohydrate in the ring-closure reaction and subsequently dry mixing 9% of phthalimidomethylquinacridone sulfonic acid (prepared according to the method of U.S. Pat. No. 3,275,637) after the conditioning step. The 2,9-dimethylquinacridone was obtained as a magenta pigment.

An alkyd melamine enamel paint prepared as described above exhibited a deeper, brighter masstone with improved transparency compared to a paint prepared using QUINDO® Magenta RV-6832.

A water-based paint prepared as described above exhibited a deeper, brighter, and more transparent masstone and stronger metallic brightness when compared to a paint prepared using QUINDO® Magenta RV-6832.

Example 8

Pigmentary 2,9-dimethylquinacridone was prepared exactly as described in Example 1 except for using 2% by weight, relative to the quinacridone, of N N-dimethylaminopropylpyrene tetrasulfonamide in the ring-closure reaction. 2,9-Dimethylquinacridone (56 g) was obtained as a brilliant magenta pigment.

The N,N-dimethylaminopropylpyrene tetrasulfonamide additive was prepared by the following method. To 20 g of pyrenetetrasulfonic acid (available from Bayer AG, Germany) was added 78 g of thionyl chloride over a period of 30 minutes, after which the mixture was stirred vigorously at ambient temperature for 1.5 hours and at reflux for 30 minutes. After the mixture was cooled to room temperature, 30.2 g of dimethylformamide was added and the mixture was heated at reflux for 30 minutes. After heating was stopped, an additional 30 g of thionyl chloride was added. The mixture was heated to reflux and maintained at reflux for two hours, cooled to room temperature with stirring, and drowned into 500 ml of stirred iced water. The resultant pyrenetetrasulfonyl chloride was collected as 17.4 g (89% of theory) of presscake. A 5.0 g portion of the pyrenetetrasulfonyl chloride was added to a solution of 4.5 g of 3-(dimethylamino)propylamine, 4.5 g of triethylamine, and 50 ml of acetone maintained at a temperature below 30° C. The reaction was stirred at room temperature for 15 hours, filtered, and washed with 100 ml of acetone to give 2.7 g of N,N-dimethylaminopropylpyrene tetrasulfonamide.

A water-based paint prepared as described above using the pigment of Example 8 exhibited deeper, brighter masstone with improved transparency when compared to a paint prepared using QUINDO® Magenta RV-6832.

Example 9

Pigmentary quinacridone was prepared according to the invention with the incorporation of about 10% by weight, relative to the quinacridone, of pyrene tetrasulfonic acid tetrasodium salt in the ring-closure reaction.

To 300 g of polyphosphoric acid (117% phosphoric acid) heated at 90° C. was added 6.8 g of pyrene tetrasulfonic acid tetrasodium salt (prepared by the method described in *Justus Liebiffs Ann. Chem.*, 540, 189–210 (1939)) followed by 68.2 g of 2,5-dianilinoterephthalic acid. The mixture was heated at 120°–125° C. for two hours. After the melt was cooled to 88° C., the acid strength was adjusted to 112% by the dropwise addition of phosphoric acid. The resultant melt was slowly poured into 453 g of methanol at 24° C. During the drown, the temperature was allowed to increase to 55° C., with the temperature being controlled by external cooling and adjustment of melt addition rate. The slurry was heated at reflux (68°–72° C.) for one hour, diluted with water, and stirred at 60° C. for 30 minutes. The solid component was collected by filtration and washed with water until acid free. The resultant presscake was reslurried in water. After adjustment of the pH to greater than 7, 7.5 g of 50% sodium hydroxide was added and the resultant slurry was heated at 90° C. for one hour. The slurry was cooled, filtered, and washed with water until alkali free, then reslurried in water. After adjustment of the pH to greater than 8.5, 3.2 g of a cycloaliphatic carboxylic acid was added. The resultant slurry was heated at about 140°–145° C. for two hours in a closed system, cooled, acidified with phosphoric acid, and stirred. The solid component was collected by filtration and washed with water. The wet cake can be dried or used as is for specific applications. Here, the wet cake was dried in an oven at 60° C. to give approximately 52 g of quinacridone as a brilliant violet pigment.

A water-based paint prepared as described above exhibited a deeper, brighter masstone with improved transparency and stronger metallic brightness when compared to a paint prepared using the pigment of comparison Example 12.

Example 10

Pigmentary quinacridone was prepared exactly as described in Example 9 except for using 10% by weight, relative to the quinacridone, of phthalimidomethylpyrene (prepared according to the method of U.S. Pat. No. 3,275,637) in the ring-closure reaction. Quinacridone (56 g) was obtained as a brilliant violet pigment.

A water-based paint prepared as described above exhibited a deeper, brighter masstone with improved transparency and increased metallic brightness when compared to a paint prepared using the pigment of comparison Example 12.

Example 11

Pigmentary quinacridone was prepared exactly as described in Example 9 except for using 10% by weight, relative to the quinacridone, of anthraquinone sulfonic acid sodium salt in the ring-closure reaction. Quinacridone (56 g) was obtained as a brilliant magenta pigment.

A water-based paint prepared as described above exhibited a deeper, brighter masstone with improved transparency and a much yellower, brighter tint and metallic when compared to a paint prepared using the pigment of comparison Example 12.

Example 12 (comparison)

Pigmentary quinacridone was prepared exactly as described in Examples 9 and 10 except for omitting an additive of the invention from the ring-closure reaction. Quinacridone (56 g) was obtained as a brilliant violet pigment.

Example 13 (comparison)

Pigmentary quinacridone was prepared in the absence of a pigment additive of the invention exactly as described in comparison Example 12 (i.e., according to Examples 9 and 10 in the absence of an additive of the invention) except for dry mixing the quinacridone with 10% pyrene tetrasulfonic acid tetrasodium salt.

A water-based paint prepared as described above exhibited a very light, dull, and opaque masstone and duller metallic brightness compared to a paint prepared using the quinacridone prepared according to Example 9 of the invention.

What is claimed is:

1. A process for the preparation of quinacridone pigments comprising
   (a) heating, at a temperature of 80° C. to 145° C., a reaction mixture comprising
      (i) 2,5-dianilinoterephthalic acid, a 2,5-dianilino-3,6-dihydroterephthalic acid ester, a derivative of 2,5-dianilinoterephthalic acid or a 2,5-dianilino-3,6-dihydroterephthalic acid ester having one or more substituents in at least one aniline ring, or a mixture thereof,
      (ii) 3 to 15 parts by weight, per part of component (a)(i), of a dehydrating agent, and
      (iii) 0.1 to 15 percent by weight, based on component (a)(i), of one or more non-pigmentary aromatic polycyclic compounds and/or derivatives thereof,
   with the proviso that if component (a)(i) is a 2,5-dianilino-3,6-dihydroterephthalic acid ester or a derivative thereof, reaction step (a) additionally comprises an oxidation step;
   (b) drowning the reaction mixture from step (a) by adding said reaction mixture to 3 to 15 parts by weight, per part of component (a)(i), of a liquid in which the quinacridone pigment is substantially insoluble;
   (c) isolating the quinacridone pigment;
   (d) optionally, conditioning the quinacridone pigment; and
   (e) optionally, blending the quinacridone pigment with one or more quinacridone derivatives.

2. A process according to claim 1 wherein component (a)(i) is selected from the group consisting of 2,5-dianilinoterephthalic acid, 2,5-di(4-methylanilino)terephthalic acid, 2,5-di(4-methoxyanilino)terephthalic acid, 2,5-di(4-chloroanilino)terephthalic acid, and mixtures thereof.

3. A process according to claim 1 wherein the reaction mixture is heated in step (a) at a temperature of 100° C. to 130° C.

4. A process according to claim 1 wherein the dehydrating agent (a)(ii) is polyphosphoric acid.

5. A process according to claim 4 wherein 3 to 10 parts by weight, relative to component (a)(i), of polyphosphoric acid is used.

6. A process according to claim 1 wherein component (a)(iii) is a non-pigmentary aromatic polycyclic compound having the formula

wherein

Q represents an aromatic polycyclic moiety;

A represents an —O—, —S—, —NR$^a$—, —SO$_2$—, —CO—, —Alk—, or —Ar— bridging group, a chemically reasonable combination of such bridging groups, or a direct bond between Q and Y;

Y represents hydrogen, $C_1$–$C_{12}$ alkyl, $C_2$–$C_{12}$ alkenyl, $C_5$–$C_7$ cycloalkyl, $C_5$–$C_7$ cycloalkenyl, $C_6$–$C_{10}$ aryl, heteroaryl having five or six ring atoms in which at least one such ring atom is N, O, S, or a combination thereof, $C_7$–$C_{16}$ aralkyl, OR$^b$, —NR$^c$R$^d$, or halogen;

—Alk— is $C_1$–$C_8$ alkylene, substituted $C_1$–$C_8$ alkylene, $C_5$–$C_7$ cycloalkylene, or substituted $C_5$–$C_7$ cycloalkylene;

—Ar— is $C_6$–$C_{10}$ arylene or substituted $C_6$–$C_{10}$ arylene;

R$^a$ is hydrogen, $C_1$–$C_{12}$ alkyl, $C_2$–$C_{12}$ alkenyl, $C_5$–$C_7$ cycloalkyl, $C_6$–$C_{10}$ aryl, or $C_7$–$C_{16}$ aralkyl;

R$^b$ is hydrogen, metal, or $C_1$–$C_{12}$ alkyl;

R$^c$ and R$^d$ are independently hydrogen, $C_1$–$C_{12}$ alkyl, $C_2$–$C_{12}$ alkenyl, $C_5$–$C_7$ cycloalkyl, $C_6$–$C_{10}$ aryl, or $C_7$–$C_{16}$ aralkyl, or R$^c$ and R$^d$ together are $C_4$–$C_6$ alkylene or are aliphatic or aromatic dicarbonyl groups, and wherein R$^c$ and R$^d$ optionally can further contain heteroatoms such as N, O, or S and optionally can further be substituted with $C_1$–$C_{12}$ alkyl, $C_1$–$C_{12}$ alkoxy, $C_2$–$C_{12}$ alkenyl, $C_5$–$C_7$ cycloalkyl, $C_5$–$C_7$ cycloalkenyl, $C_5$–$C_7$ cycloalkoxy, $C_6$–$C_{10}$ aryl, $C_6$–$C_{10}$ aryloxy, $C_7$–$C_{16}$ aralkyl, $C_7$–$C_{16}$ aralkoxy, —OH, halogen, —CN, carboxyl, —CO—NR$^c$R$^d$, or —SO$_2$—NR$^c$R$^d$; and n is from 0.01 to 4.

7. A process according to claim 6 wherein Q represents a non-pigmentary aromatic polycyclic moiety derived from an anthracene, phenanthrene, pyrene, chrysene, indole, thiazole, benzimidazole, quinoline, acridone, anthraquinone, phenothiazine, quinazoline, carbazole, benzanthrone, or perylene or a derivative thereof substituted with one or more halogen, $C_1$–$C_6$ alkyl, $C_1$–$C_6$ alkoxy, $C_5$–$C_7$ cycloalkyl, $C_5$–$C_7$ cycloalkoxy, $C_6$–$C_{10}$ aryl, $C_6$–$C_{10}$ aryloxy, $C_7$–$C_{16}$ aralkyl, $C_7$–$C_{16}$ aralkoxy, nitro, or cyano groups.

8. A process according to claim 6 wherein Q is a non-pigmentary aromatic polycyclic moiety, A represents a direct bond between Q and Y, and Y is hydrogen.

9. A process according to claim 1 wherein component (a)(iii) is anthraquinone or pyrene.

10. A process according to claim 1 wherein component (a)(iii) is a non-pigmentary aromatic polycyclic compound having the formula

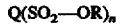

wherein

Q represents an aromatic polycyclic moiety;

R is hydrogen or a metal; and n is from 0.01 to 4.

11. A process according to claim 9 wherein Q is anthraquinone or pyrene.

12. A process according to claim 1 wherein component (a)(iii) is anthraquinone-2-sulfonic acid or a sodium salt thereof, anthraquinone-2,6-disulfonic acid or a sodium salt thereof, phthalimidomethylanthraquinone, pyrene tetrasulfonic acid or a sodium salt thereof, or phthalimidomethylpyrene.

13. A process according to claim 1 wherein the reaction mixture from step (a) is drowned by adding said reaction mixture to water, a lower aliphatic alcohol, or a mixture thereof.

14. A process according to claim 1 wherein the reaction mixture from step (a) is drowned by adding said reaction mixture to methanol.

15. A quinacridone pigment prepared by the process according to claim 1.

* * * * *